(12) United States Patent
Pritzkau et al.

(10) Patent No.: US 11,128,651 B2
(45) Date of Patent: *Sep. 21, 2021

(54) PATTERN CREATION IN ENTERPRISE THREAT DETECTION

(71) Applicant: SAP SE, Walldorf (DE)

(72) Inventors: Eugen Pritzkau, Wiesloch (DE); Joscha Philipp Bohn, Heidelberg (DE); Daniel Kartmann, Oftersheim (DE); Wei-Guo Peng, Dallau (DE); Hristina Dinkova, Nussloch (DE); Lin Luo, Wiesloch (DE); Thomas Kunz, Lobenfeld (DE); Marco Rodeck, Maikammer (DE); Hartwig Seifert, Elchesheim-Illingen (DE); Harish Mehta, Wiesenbach (DE); Nan Zhang, Schriesheim (DE); Rita Merkel, Ilvesheim (DE); Florian Chrosziel, St. Leon-Rot (DE)

(73) Assignee: SAP SE, Walldorf (DE)

( * ) Notice: Subject to any disclaimer, the term of this patent is extended or adjusted under 35 U.S.C. 154(b) by 60 days.

This patent is subject to a terminal disclaimer.

(21) Appl. No.: 16/734,986

(22) Filed: Jan. 6, 2020

(65) Prior Publication Data
US 2020/0145444 A1 May 7, 2020

Related U.S. Application Data

(63) Continuation of application No. 15/639,907, filed on Jun. 30, 2017, now Pat. No. 10,530,794.

(51) Int. Cl.
*H04L 29/06* (2006.01)
*G06F 3/0482* (2013.01)
*G06F 21/55* (2013.01)
*G06F 16/33* (2019.01)

(52) U.S. Cl.
CPC ........ *H04L 63/1425* (2013.01); *G06F 3/0482* (2013.01); *G06F 21/55* (2013.01); *H04L 63/1416* (2013.01); *G06F 16/3344* (2019.01)

(58) Field of Classification Search
CPC ............ H04L 63/1425; H04L 63/1416; G06F 3/0482; G06F 21/55; G06F 16/3344
USPC .......................................................... 726/23
See application file for complete search history.

(56) References Cited

U.S. PATENT DOCUMENTS

| | | |
|---|---|---|
| 5,440,726 A | 8/1995 | Fuchs |
| 5,960,170 A | 9/1999 | Chen |

(Continued)

OTHER PUBLICATIONS

Office Action issued in U.S. Appl. No. 15/216,046 dated Aug. 21, 2019, 23 pages.

(Continued)

*Primary Examiner* — Michael S McNally
(74) *Attorney, Agent, or Firm* — Fish & Richardson P.C.

(57) ABSTRACT

Search results are received from an initiated free text search of log data from one or more logs, where the free text is performed using search terms entered into a free text search graphical user interface. A set of at least one search result is selected from the search results containing an event desired to be identified in a completed enterprise threat detection (ETD) pattern. A forensic lab application is rendered to complete an ETD pattern. An event filter is added for an event type based on normalized log data to a path. A relative ETD pattern time range is set and an ETD pattern is completed based on the added event filter.

20 Claims, 12 Drawing Sheets

(56) References Cited

U.S. PATENT DOCUMENTS

| | | |
|---|---|---|
| 6,173,418 B1 | 1/2001 | Fujino et al. |
| 6,629,106 B1 | 9/2003 | Narayanaswamy |
| 6,779,001 B1 | 8/2004 | Kanai et al. |
| 7,376,969 B1 | 5/2008 | Njemanze |
| 7,380,205 B2 | 5/2008 | Bezrukov et al. |
| 7,441,197 B2 | 10/2008 | Tschiegg et al. |
| 7,457,792 B2 | 11/2008 | Weigt et al. |
| 7,457,793 B2 | 11/2008 | Weigt et al. |
| 7,457,794 B2 | 11/2008 | Weigt et al. |
| 7,545,969 B2 | 6/2009 | Bennett |
| 7,624,092 B2 | 11/2009 | Lieske et al. |
| 7,627,544 B2 | 12/2009 | Chkodrov |
| 7,756,808 B2 | 7/2010 | Weigt et al. |
| 7,756,809 B2 | 7/2010 | Weigt et al. |
| 7,761,396 B2 | 7/2010 | Weigt et al. |
| 7,783,723 B2 | 8/2010 | Peng et al. |
| 7,788,718 B1 | 8/2010 | Fei |
| 7,872,982 B2 | 1/2011 | Atkins |
| 7,908,660 B2 | 3/2011 | Bahl |
| 7,934,257 B1 | 4/2011 | Kienzle |
| 7,961,633 B2 | 6/2011 | Shankar |
| 7,971,209 B2 | 6/2011 | Eberlein et al. |
| 8,051,034 B2 | 11/2011 | Mehta et al. |
| 8,091,117 B2 | 1/2012 | Williams |
| 8,474,047 B2 | 6/2013 | Adelstein |
| 8,484,726 B1 | 7/2013 | Sutton |
| 8,554,907 B1 | 10/2013 | Chen et al. |
| 8,661,103 B2 | 2/2014 | Mehta et al. |
| 8,775,671 B2 | 7/2014 | Rodeck et al. |
| 8,892,454 B2 | 11/2014 | Rabetge et al. |
| 8,954,602 B2 | 2/2015 | Seifert et al. |
| 8,973,147 B2 | 3/2015 | Pearcy |
| 9,037,678 B2 | 5/2015 | Mehta et al. |
| 9,075,633 B2 | 7/2015 | Nos |
| 9,106,697 B2 | 8/2015 | Capalik et al. |
| 9,116,906 B2 | 8/2015 | Nos et al. |
| 9,148,488 B2 | 9/2015 | Rabetge et al. |
| 9,170,951 B1 | 10/2015 | He |
| 9,251,011 B2 | 2/2016 | Meier et al. |
| 9,262,519 B1 | 2/2016 | Saurabh |
| 9,304,978 B2 | 4/2016 | Bezrukov et al. |
| 9,313,421 B2 | 4/2016 | Deshpande |
| 9,336,385 B1 * | 5/2016 | Spencer .................. G06F 21/56 |
| 9,348,665 B2 | 5/2016 | Storz et al. |
| 9,383,934 B1 | 7/2016 | Likacs |
| 9,419,989 B2 | 8/2016 | Harris |
| 9,524,389 B1 | 12/2016 | Roth |
| 9,619,984 B2 | 4/2017 | Donovan |
| 9,690,931 B1 | 6/2017 | Anantharaja et al. |
| 9,779,147 B1 | 10/2017 | Sherman et al. |
| 9,779,150 B1 | 10/2017 | Sherman |
| 9,843,596 B1 | 12/2017 | Averbuch |
| 9,979,741 B2 | 5/2018 | Fuhrman |
| 10,001,389 B1 | 6/2018 | Das et al. |
| 10,003,605 B2 | 6/2018 | Muddu et al. |
| 10,079,842 B1 | 9/2018 | Brandwine et al. |
| 10,102,379 B1 | 10/2018 | Seifert et al. |
| 10,140,447 B2 * | 11/2018 | Rahaman .............. G06F 21/554 |
| 10,148,675 B1 | 12/2018 | Brandwine et al. |
| 10,681,064 B2 | 6/2020 | Peng et al. |
| 10,986,111 B2 | 4/2021 | Peng et al. |
| 2002/0070953 A1 | 6/2002 | Barg |
| 2003/0074471 A1 | 4/2003 | Anderson |
| 2003/0115484 A1 | 6/2003 | Mariconi et al. |
| 2003/0217137 A1 | 11/2003 | Roese |
| 2004/0015481 A1 | 1/2004 | Zinda |
| 2004/0044912 A1 | 3/2004 | Connary |
| 2004/0078490 A1 | 4/2004 | Anderson |
| 2004/0093513 A1 | 5/2004 | Cantrell |
| 2005/0027667 A1 | 2/2005 | Kroll et al. |
| 2006/0037075 A1 | 2/2006 | Frattura |
| 2006/0059115 A1 | 3/2006 | Gulfleisch et al. |
| 2006/0106847 A1 | 5/2006 | Eckardt et al. |
| 2006/0161816 A1 | 7/2006 | Gula et al. |
| 2006/0218140 A1 | 9/2006 | Whitney |
| 2006/0253907 A1 | 11/2006 | McConnell |
| 2007/0067438 A1 | 3/2007 | Goranson et al. |
| 2007/0073519 A1 | 3/2007 | Long |
| 2007/0100905 A1 | 5/2007 | Masters et al. |
| 2007/0115998 A1 | 5/2007 | McElligott |
| 2007/0136437 A1 | 6/2007 | Shankar et al. |
| 2007/0150596 A1 | 6/2007 | Miller et al. |
| 2007/0183389 A1 | 8/2007 | Clee |
| 2007/0186284 A1 | 8/2007 | McConnell |
| 2007/0266387 A1 | 11/2007 | Henmi |
| 2007/0283192 A1 | 12/2007 | Shevchenko |
| 2007/0300296 A1 | 12/2007 | Kudla |
| 2008/0033966 A1 | 2/2008 | Wahl |
| 2008/0034425 A1 | 2/2008 | Overcash et al. |
| 2008/0080384 A1 | 4/2008 | Atkins |
| 2008/0091681 A1 | 4/2008 | Dwivedi |
| 2008/0163085 A1 | 7/2008 | Subbu et al. |
| 2008/0288889 A1 | 11/2008 | Hunt et al. |
| 2008/0295173 A1 | 11/2008 | Tsvetanov |
| 2008/0320552 A1 | 12/2008 | Kumar |
| 2009/0044277 A1 | 2/2009 | Aaron et al. |
| 2009/0049518 A1 | 2/2009 | Roman |
| 2009/0288164 A1 | 11/2009 | Adelstein |
| 2009/0293046 A1 | 11/2009 | Cheriton |
| 2009/0300045 A1 | 12/2009 | Chaudhry et al. |
| 2009/0312026 A1 | 12/2009 | Parameswar |
| 2010/0011031 A1 | 1/2010 | Huang |
| 2010/0114832 A1 | 5/2010 | Lillibridge |
| 2010/0180325 A1 | 7/2010 | Golobay |
| 2011/0098928 A1 | 4/2011 | Hoffman et al. |
| 2011/0213741 A1 | 9/2011 | Shama |
| 2011/0277034 A1 | 11/2011 | Hanson |
| 2011/0320816 A1 | 12/2011 | Yao |
| 2012/0005542 A1 | 1/2012 | Petersen |
| 2012/0158653 A1 | 6/2012 | Shaffer et al. |
| 2012/0167161 A1 | 6/2012 | Kim et al. |
| 2012/0191660 A1 | 7/2012 | Hoog |
| 2012/0210434 A1 | 8/2012 | Curtis et al. |
| 2012/0271748 A1 | 10/2012 | DiSalvo |
| 2012/0271790 A1 | 10/2012 | Lappas et al. |
| 2012/0317078 A1 | 12/2012 | Zhou et al. |
| 2013/0086023 A1 | 4/2013 | Tsukamoto et al. |
| 2013/0106830 A1 | 5/2013 | de Loera |
| 2013/0198840 A1 | 8/2013 | Drissi et al. |
| 2013/0212709 A1 | 8/2013 | Tucker |
| 2013/0262311 A1 | 10/2013 | Buhrmann |
| 2013/0298243 A1 | 11/2013 | Kumar et al. |
| 2013/0304665 A1 | 11/2013 | Rodeck et al. |
| 2013/0304666 A1 | 11/2013 | Rodeck et al. |
| 2013/0305369 A1 | 11/2013 | Karta |
| 2013/0326079 A1 | 12/2013 | Seifert et al. |
| 2013/0347111 A1 | 12/2013 | Karta |
| 2014/0047413 A1 | 2/2014 | Sheive et al. |
| 2014/0201836 A1 | 7/2014 | Amsler |
| 2014/0223283 A1 | 8/2014 | Hancock |
| 2014/0244623 A1 | 8/2014 | King |
| 2014/0317681 A1 | 10/2014 | Shende |
| 2015/0007325 A1 | 1/2015 | Eliseev |
| 2015/0067880 A1 | 3/2015 | Ward |
| 2015/0073868 A1 | 3/2015 | Garman |
| 2015/0106867 A1 | 4/2015 | Liang |
| 2015/0109305 A1 | 4/2015 | Black |
| 2015/0143521 A1 | 5/2015 | Eliseev |
| 2015/0154524 A1 | 6/2015 | Borodow |
| 2015/0180891 A1 | 6/2015 | Seward |
| 2015/0215329 A1 | 7/2015 | Singla |
| 2015/0237065 A1 | 8/2015 | Roytman |
| 2015/0264011 A1 | 9/2015 | Liang |
| 2015/0278371 A1 | 10/2015 | Anand |
| 2015/0281278 A1 | 10/2015 | Gooding |
| 2015/0310070 A1 | 10/2015 | Stefik et al. |
| 2015/0319185 A1 | 11/2015 | Kirti |
| 2015/0341389 A1 | 11/2015 | Kurakami |
| 2015/0347751 A1 | 12/2015 | Card et al. |
| 2015/0355957 A1 | 12/2015 | Steiner |
| 2015/0358344 A1 | 12/2015 | Mumcuoglu |
| 2015/0381646 A1 | 12/2015 | Lin |
| 2016/0057166 A1 | 2/2016 | Chesla |
| 2016/0057167 A1 | 2/2016 | Bach et al. |

(56) References Cited

U.S. PATENT DOCUMENTS

| | | |
|---|---|---|
| 2016/0065594 A1 | 3/2016 | Srivastava et al. |
| 2016/0092535 A1 | 3/2016 | Kuchibhotla et al. |
| 2016/0127391 A1 | 5/2016 | Kobres |
| 2016/0164891 A1 | 6/2016 | Satish et al. |
| 2016/0202893 A1 | 7/2016 | Mustonen et al. |
| 2016/0226905 A1 | 8/2016 | Baikalov et al. |
| 2016/0248798 A1* | 8/2016 | Cabrera ............. H04L 63/1433 |
| 2016/0291982 A1 | 10/2016 | Mizrahi |
| 2016/0292061 A1 | 10/2016 | Marron |
| 2016/0337384 A1 | 11/2016 | Jansson |
| 2016/0359886 A1 | 12/2016 | Yadav et al. |
| 2016/0364315 A1 | 12/2016 | Lee |
| 2016/0364571 A1 | 12/2016 | Lee |
| 2016/0364740 A1 | 12/2016 | Parker |
| 2016/0366174 A1 | 12/2016 | Cherinin |
| 2016/0373476 A1 | 12/2016 | Dell'anno et al. |
| 2016/0378978 A1 | 12/2016 | Singla |
| 2016/0381049 A1 | 12/2016 | Lakhani |
| 2017/0004005 A1 | 1/2017 | Elliott |
| 2017/0026400 A1 | 1/2017 | Adams et al. |
| 2017/0031002 A1* | 2/2017 | Newton ................. G01S 7/021 |
| 2017/0034023 A1 | 2/2017 | Nickolov |
| 2017/0070415 A1 | 3/2017 | Bell et al. |
| 2017/0091008 A1 | 3/2017 | Cherbakov |
| 2017/0093902 A1 | 3/2017 | Roundy et al. |
| 2017/0123875 A1 | 5/2017 | Craik et al. |
| 2017/0148060 A1 | 5/2017 | Showers |
| 2017/0169217 A1 | 6/2017 | Rahaman |
| 2017/0185273 A1 | 6/2017 | Marache-Francisco et al. |
| 2017/0185439 A1 | 6/2017 | Chiueh et al. |
| 2017/0195439 A1 | 7/2017 | Dixon et al. |
| 2017/0251365 A1 | 8/2017 | Burchard |
| 2017/0270006 A1 | 9/2017 | Kankylas |
| 2017/0279837 A1 | 9/2017 | Dasgupta |
| 2017/0287179 A1 | 10/2017 | Tibshirani et al. |
| 2017/0302685 A1 | 10/2017 | Ladnai et al. |
| 2017/0308602 A1 | 10/2017 | Raghunathan et al. |
| 2017/0310690 A1 | 10/2017 | Mestha et al. |
| 2017/0316026 A1 | 11/2017 | Kanthak et al. |
| 2017/0318036 A1 | 11/2017 | Movsisyan |
| 2017/0322993 A1 | 11/2017 | Brodt et al. |
| 2017/0324766 A1 | 11/2017 | Gonzalez |
| 2017/0329972 A1 | 11/2017 | Brisebois et al. |
| 2018/0027002 A1 | 1/2018 | Rodeck et al. |
| 2018/0027010 A1 | 1/2018 | Pritzkau et al. |
| 2018/0059876 A1 | 3/2018 | Peng et al. |
| 2018/0063167 A1 | 3/2018 | Rodeck |
| 2018/0091535 A1 | 3/2018 | Chrosziel |
| 2018/0091536 A1 | 3/2018 | Chrosziel et al. |
| 2018/0157835 A1 | 6/2018 | Nos |
| 2018/0173872 A1 | 6/2018 | Lam et al. |
| 2018/0173873 A1 | 6/2018 | Hassforther et al. |
| 2018/0176234 A1 | 6/2018 | Kunz et al. |
| 2018/0176235 A1 | 6/2018 | Lam et al. |
| 2018/0176238 A1 | 6/2018 | Nos et al. |
| 2018/0234447 A1 | 8/2018 | Mueen |
| 2019/0005423 A1 | 1/2019 | Pritzkau et al. |
| 2019/0007435 A1 | 1/2019 | Pritzkau et al. |
| 2019/0190927 A1 | 6/2019 | Peng et al. |
| 2019/0190935 A1 | 6/2019 | Peng et al. |
| 2020/0195680 A1 | 6/2020 | Pritzkau et al. |

OTHER PUBLICATIONS

Non-Final Office Action issued in U.S. Appl. No. 15/639,863 dated Jun. 24, 2019, 37 pages.

Office Action issued in U.S. Appl. No. 15/847,478, dated Aug. 6, 2019, 36 pages.

U.S. Office Action in related U.S. Appl. No. 15/383,771 dated Jul. 5, 2019, 16 pages.

Final Office Action issued in U.S. Appl. No. 15/381,567 dated May 22, 2019, 28 pages.

Non-Final Office Action issued in U.S. Appl. No. 15/216,046 dated Apr. 29, 2019, 23 pages.

Non-Final Office Action issued in U.S. Appl. No. 15/246,053 dated May 17, 2019, 28 pages.

Non-Final Office Action issued in U.S. Appl. No. 15/274,569 dated Mar. 22, 2019, 11 pages.

Final Office Action issued in U.S. Appl. No. 15/370,084 dated Feb. 4, 2019, 16 pages.

Final Office Action issued in U.S. Appl. No. 15/274,693 dated Feb. 11, 2019, 19 pages.

Schumacher, "An effective way to bring SAP Security Notes under control," Virtual Forge GmbH, Feb. 2017, https://blog.virtualforge.com/en/an-effective-way-to-bring-sap-security-notes-under-control, 4 pages.

U.S. Office Action in related U.S. Appl. No. 15/274,693 dated Jul. 26, 2018, 14 pages.

U.S. Office Action in related U.S. Appl. No. 15/370,084 dated Aug. 27, 2018, 14 pages.

U.S. Office Action in related U.S. Appl. No. 15/383,771 dated Aug. 3, 2018, 12 pages.

U.S. Office Action in related U.S. Appl. No. 15/216,201 dated Mar. 7, 2018, 14 pages.

U.S. Office Action in related U.S. Appl. No. 15/216,201 dated Jul. 20, 2018, 15 pages.

U.S. Office Action in related U.S. Appl. No. 15/246,053 dated May 21, 2018, 14 pages.

U.S. Office Action in related U.S. Appl. No. 15/246,053 dated Sep. 24, 2018, 14 pages.

U.S. Office Action in related U.S. Appl. No. 15/253,438 dated Sep. 19, 2018, 17 pages.

U.S. Office Action in related U.S. Appl. No. 15/274,569 dated Apr. 16, 2018, 11 pages.

U.S. Office Action in related U.S. Appl. No. 15/274,569 dated Nov. 14, 2018, 10 pages.

U.S. Office Action in related U.S. Appl. No. 15/380,379 dated Jul. 19, 2018, 9 pages.

U.S. Office Action in related U.S. Appl. No. 15/380,450 dated Aug. 27, 2018, 19 pages.

U.S. Office Action in related U.S. Appl. No. 15/380,450 dated Jan. 23, 2019, 21 pages.

U.S. Office Action in related U.S. Appl. No. 15/380,450 dated Nov. 2, 2018, 19 pages.

U.S. Office Action in related U.S. Appl. No. 15/381,567 dated Nov. 2, 2018, 17 pages.

U.S. Office Action in related U.S. Appl. No. 15/383,771 dated Jan. 23, 2019, 14 pages.

Final office action issued in U.S. Appl. No. 15/847,478 dated Nov. 25, 2019, 14 pages.

Final Office Action issued in U.S. Appl. No. 15/383,771 dated Oct. 31, 2019, 23 pages.

Non-final office action issued in U.S. Appl. No. 15/381,567 dated Oct. 7, 2019, 17 pages.

Non-final office action issued in U.S. Appl. No. 15/847,478 dated Jun. 9, 2020, 13 pages.

Final Office Action issued in U.S. Appl. No. 15/847,478 dated Sep. 21, 2020, 14 pages.

Non-Final Office Action issued in U.S. Appl. No. 16/741,071 dated Sep. 1, 2020, 32 pages.

* cited by examiner

PATTERN CREATION IN ENTERPRISE THREAT DETECTION

BACKGROUND

Enterprise threat detection (ETD) typically collects and stores a large amount/large sets of log data associated with various heterogeneous systems (often referred to as "big data"). The stored data can be analyzed computationally using forensic-type data analysis tools to identify suspicious behavior in revealed patterns, trends, interactions, and associations, especially relating to ETD behavior. Appropriate responses can then be taken if malicious behavior is suspected or identified. The forensic environment permits the creation of ETD patterns based on created filters to generate alerts when log data meeting the filter criteria is detected.

SUMMARY

The present disclosure describes creating patterns in enterprise threat detection (ETD).

In an implementation, Search results are received from an initiated free text search of log data from one or more logs, where the free text is performed using search terms entered into a free text search graphical user interface. A set of at least one search result is selected from the search results containing an event desired to be identified in a completed ETD pattern (or pattern). A forensic lab application is rendered to complete an ETD pattern. An event filter is added for an event type based on normalized log data to a path. A relative ETD pattern time range is set and an ETD pattern is based on the added event filter.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, the described methodology permits search over raw logs in an interactive manner. Second, once search results correspond to desired requirements, an ETD pattern based on normalized logs can be completed. Third, a user does not need knowledge about ETD events as searches for known search terms in ETD logs can be used to complete ETD patterns. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
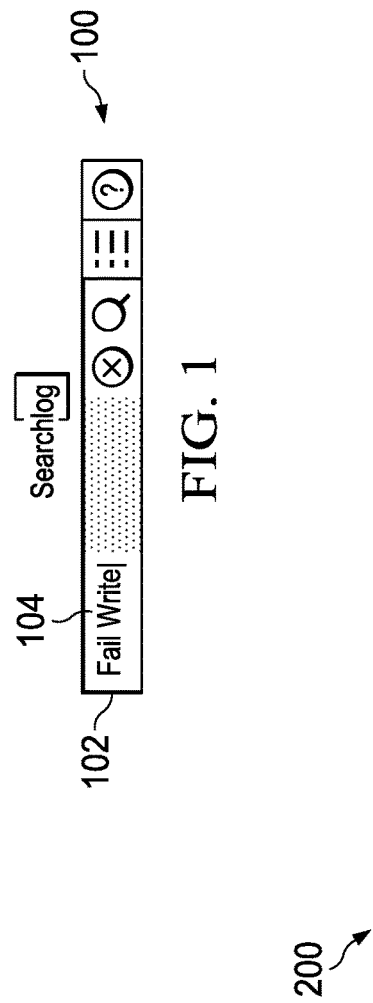
FIG. 1 is a block diagram illustrating an example enterprise threat detection (ETD) free search graphical user interface (GUI), according to an implementation.

The following detailed description describes completing patterns in enterprise threat detection (ETD), and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

ETD typically collects and stores a large amount/large sets of log data associated with various heterogeneous systems (often referred to as "big data"). The collected log data is usually analyzed using forensic-type data analysis tools in a forensic environment to identify suspicious behavior and to allow an appropriate response.

ETD normalizes logs and keeps a reference (for example, with a universally unique identifier (UUID)) from each raw log to a corresponding normalized log. In the forensic lab environment, event types (semantic attributes) based on normalized log fields are offered to search over logs, to create a series ("path") of one or more filters on these sematic attributes. ETD patterns for attack detection can be based on paths. When log data meeting the filter criteria is detected, an alert can be generated for further investigation.

Additionally, in the forensic lab environment, an attribute "Event, Original Message" is offered. This event type contains raw log data corresponding to a normalized log. In the forensic lab environment, it is possible to create efficient ETD patterns based on normalized log fields and less efficient ETD patterns based on the attribute "Event, Original Message", for which execution takes more time and consumes more resources.

ETD also offers a search UI free search functionality (illustrated as "Searchlog") permitting a free search over persisted log data (for example, for multiple different systems and time frames). In some implementations, the search can be performed independently of whether the log data is recognized (that is, interpreted) or normalized. This means that unknown log formats and raw data can be searched by the provided search functionality.

To assist with understanding, the disclosure provides an example of the free search and associated ETD pattern creation functionality using a filter for log data using a protocol with the "Fail write file" action. As will be appreciated by those of ordinary skill in the art, this is only one possible example. This example is not meant to limit or to constrain the disclosure in any way. Other examples and functionality consistent with this disclosure are considered to be within the scope of this disclosure.

FIG. 1 is a block diagram illustrating an example enterprise threat detection (ETD) free search graphical user interface (GUI) 100, according to an implementation. The GUI 100 includes a text entry field 102. As illustrated, "Fail write" have been entered as search terms (keys) 104 into the text entry field 102. In some implementations, the GUI 100 can also support searching on other data (for example, images, icons, and other types of non-textual data). Once desired terms have been entered into the text entry field 102, the user can initiate a free text search (for example, by selecting "ENTER" on a keyboard or selecting a GUI button) in the free search GUI 100.

Figure 2:
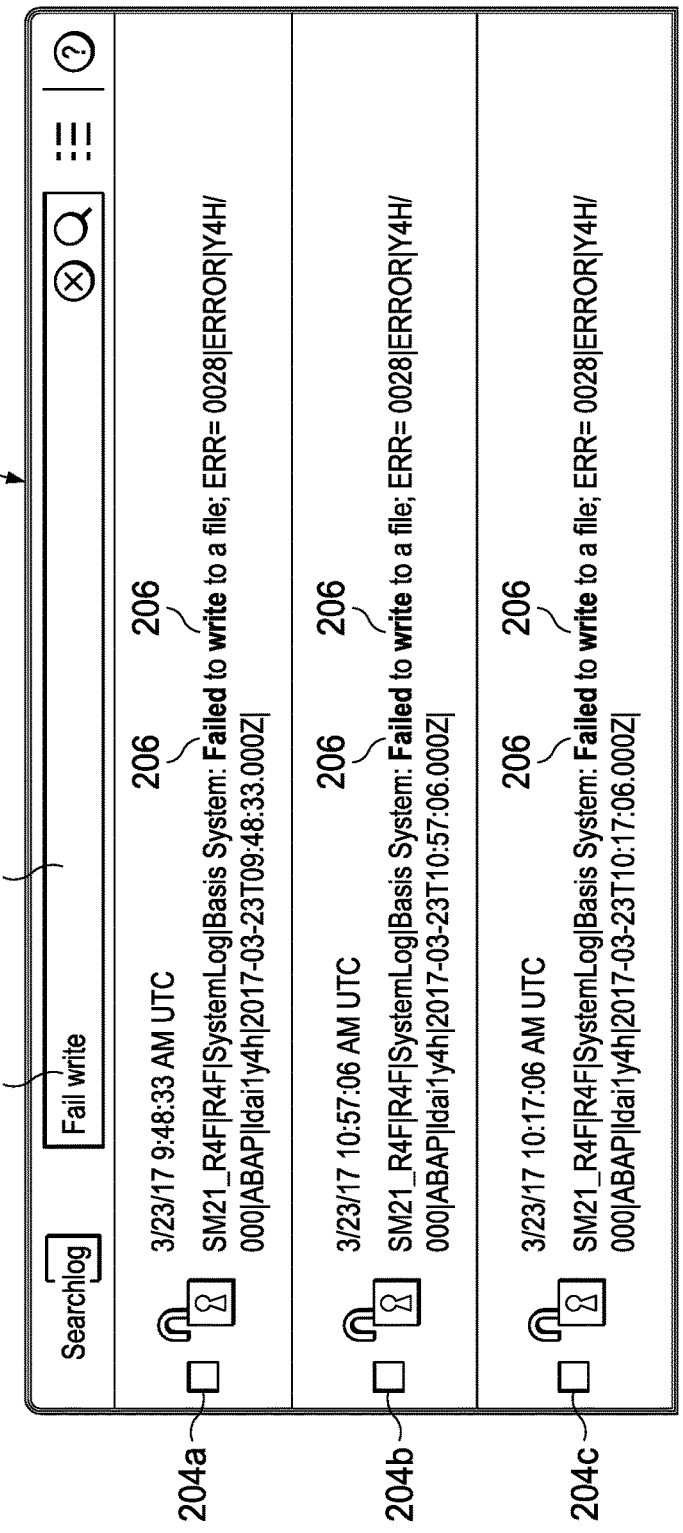
FIG. 2 is an illustration of a screenshot of returned search results based on search terms (keys) entered into the GUI of FIG. 1, according to an implementation.

FIG. 2 is an illustration of a screenshot 200 of returned search results 202 based on the terms entered into the GUI 100 of FIG. 1, according to an implementation. As illustrated, search results 202 are received and include log entries 204a, 204b, and 204c from three separate logs stored in database tables containing the free text search terms. Log content distinguishes separate log types (for example, network logs and application logs). Note that each log for which entries are displayed includes the terms "Failed" and "write" (at 206) as specified in the text entry field 102 of FIG. 1. Each log entry has a different timestamp (for example, 204a: "3/23/17 9:48:33 AM UTC", 204b: "3/23/17 10:57:06 AM UTC," and 204c: "3/23/17 10:17:06 AM UTC"). Once content of a log entry in a specific log meets specified search criteria (for example, log entries 204a, 204b, and 204c), that log entry is displayed for review. Log content distinguishes separate log types. While the results are based on a "AND" type search (that is, "Failed" AND "write"), other possible search types are also possible (for example, an "OR"-type search). Additionally, some implementations can permit advanced search term specification with more complicated logical relationships or regular expressions. Note that the original search terms are included in search term box 208 for reference.

Figure 3:
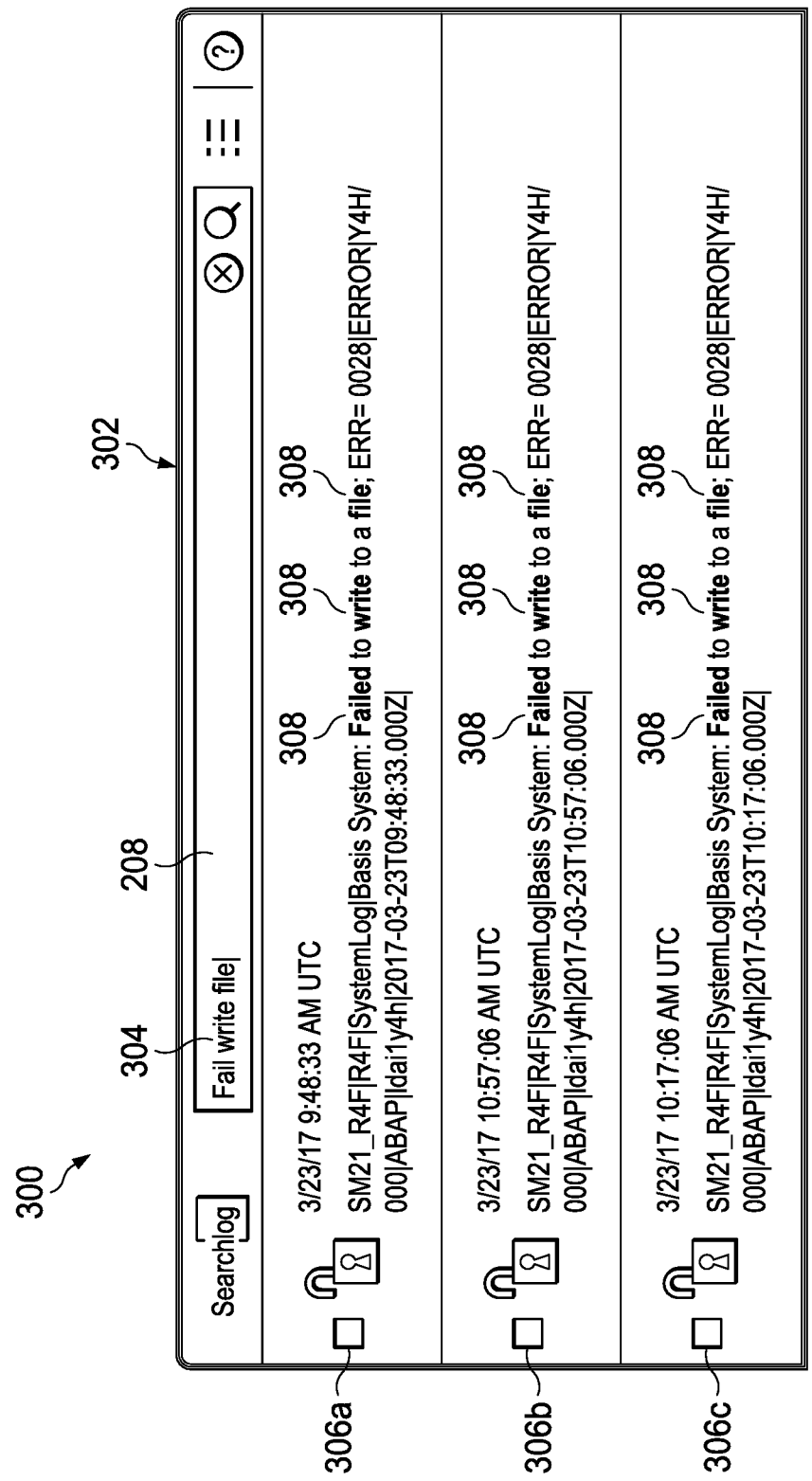
FIG. 3 is an illustration of a screenshot of returned refined search results based on refined search terms, according to an implementation.

FIG. 3 is an illustration of a screenshot 300 of returned refined search results 302 based on refined search terms 304, according to an implementation. A further free text search is performed to refine and make a prior free text search more specific. In particular, an analyst is interested in "Failed write" operations of type "file." As a result, the additional search term "file" is added to the original search terms 104 ("Failed write") at terms 304 ("Fail write file"). The additional search term "file" can be added to term box 208 in the original search results 202. Once changes/new terms have been added to the term box 208, a free text refinement search can be initiated (for example, by again selecting "ENTER" on a keyboard or selecting a GUI button).

Received refined search results 302 also include three log entries 306a, 306b, and 306c. Note that each log entry includes the terms "Failed," "write," and "file" (at 308) as specified for refinement. Similar to the original search, the results are typically based on an "AND" type search (that is, "Failed" AND "write" AND "file"), other possible search types for refinement are also possible (for example, an "OR"-type search). Additionally, some implementations can permit advanced search term specification with more complicated logical relationships or regular expressions.

The ability to use a free term search is a natural method of searching. The ease of use permits fast and instinctive changing and refinement of search terms to search for desired results.

Figure 4:
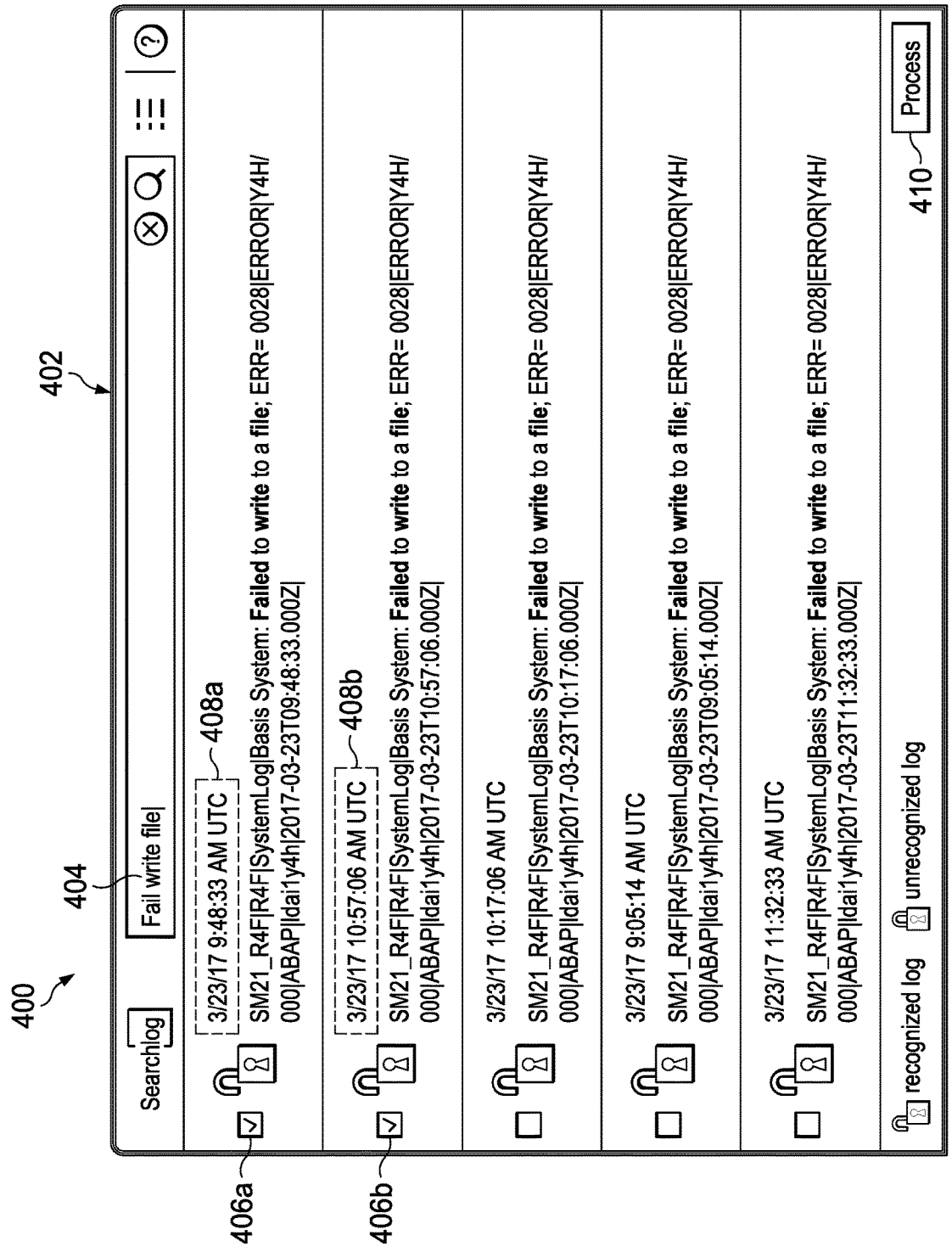
FIG. 4 is an illustration of a screenshot of selecting returned search results to process, according to an implementation.

FIG. 4 is an illustration of a screenshot 400 of selecting returned search results 402 to process, according to an implementation. As illustrated, for search results associated with search terms "Fail write file" 404, an analyst can select checkboxes 406a and 406b associated with the first two search results (for example, using a pointer and selection device or touchscreen) to enable the two search results for further processing. Note that the timestamps 408a and 408b of the search results applicable to the selected checkboxes 406a/406b are used as time range boundaries for processing the search results. If more than two entries are selected, the earliest and latest time stamps form time range boundaries for processing. Once the checkboxes are selected, the "Process" button 410 can be selected (for example, using a pointer and selection device or touchscreen) to process the selected search results.

Figure 5:
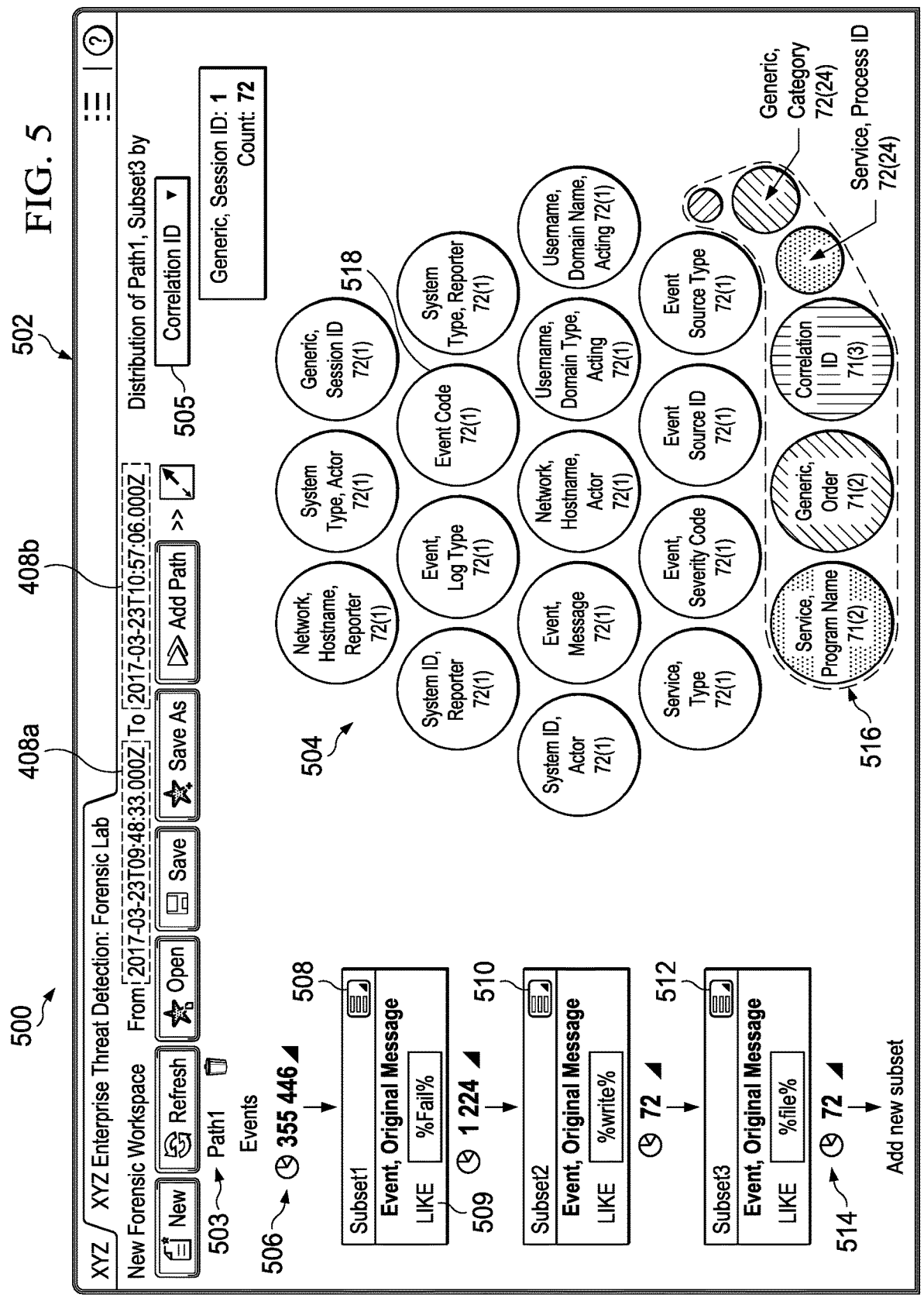
FIG. 5 is an illustration of a screenshot of an ETD forensic lab, according to an implementation.

FIG. 5 is an illustration of a screenshot 500 of an ETD forensic lab 502, according to an implementation. The ETD forensic lab 502 reflects a time range corresponding to the time stamps 408a and 408b of the selected log entries in FIG. 4. In other words, from all log entries selected in search result list of FIG. 4 (406a and 406b in FIG. 4), the associated minimum and maximum timestamp values (408a and 408b) of the log entries are converted into the upper and lower boundaries of a time range, so that the data of the logs between the minimum and maximum timestamp values of the selected log entries (406a and 406b in FIG. 4) is reflected in the ETD forensic lab 502. Note that, in some implementations, other data (either related or unrelated to logs associated with the log entries 406a and 406b) can also be reflected in the ETD forensic lab 502.

Raw data is data produced by systems or applications. In some implementations, the raw data (for example, log entries) is persisted in ETD in one database field as one binary large object (BLOB) or one STRING per log. Such raw log data makes it possible to search by a user's own search terms in the BLOB/STRING field of raw data in a free text search manner.

In contrast, the content of each raw data log is categorized/distributed into many different database fields when generating normalized log data. Each normalized log has additional database fields added with context information (for example, for a particular dynamic IP address, a device MAC address and host name can be saved). Performance optimized ETD patterns can only run over normalized data.

General ETD patterns running over raw data are significantly slower as data is not categorized/distributed and must be searched.

In the forensic lab 502, individual filters based on raw or normalized data can be defined. The filters are associated with a path 503 (here "Path 1").

The bubblegram 504 presents many "bubbles" in a user interface. The distribution of events associated with path 503 is illustrated to be by distribution value 505 (here "Correlation ID"). Here, "Correlation ID" is one of possible selectable dimensions of the applicable log data. Bubblegram 504 displays the entire data distribution and count of events for path 503. Generally, all event types that contain values are shown in the bubblegram 504. Some technical events, such as timestamp or timestamp of insertion (where the distribution of values is very high), can, in some implementations, be configured to not be displayed. Bubblegram 504 only shows only dimensions that contain values to filter out non-applicable dimensions from review.

Each bubble of the bubblegram 504 illustrates a particular count/distribution of dimensions/attributes in the path 503, which are not zero. For example, a bubble displaying the dimension "Service, Program Name 71(2)" means that there is a count of 71 event values with 2 distinct values in the overall 71 log event count (in this case, some of the 2 distinct values are repeated which results in only 2 distinct overall values).

In some implementations, ranking of bubbles in the bubblegram 504 can be used as a measure of relevance (or relatedness) of the dimension/attribute associated with the particular bubble to the dimension/attribute represented by the overall bubblegram 504. In typical implementations, the size of each of the displayed bubbles is mapped to a ranking value of the distribution. Accordingly, smaller sized bubbles can be either ignored or considered less important unless the associated dimension/attribute is of particular known relevance.

In some implementations, the bubbles are positioned according to their rankings, typically with the highest ranking bubbles in the middle of the bubblegram and the lowest ranking bubbles positioned outwardly from the middle toward the edges of the bubblegram as ranking decreases. Larger-sized bubbles are placed more toward the middle of the bubblegram and are more easily seen and considered to be of higher relevance to the associated dimension/attribute represented by the overall bubblegram 504.

The bubbles of the bubblegram 504 illustrate, within the set time range (for example, approximately 1 hour), a distribution of event types based on normalized log data that meets filter criteria (based on raw or normalized log data).

For example, the associated log data in the applicable time range contains "355,466" events 506. In the example of FIG. 5, filters (for example, Subset1 508, Subset2 510, and Subset3 512), have been previously added to narrow events types to be investigated. Each filter 508, 510, and 512 is applied on raw data over an attribute (for example, "Event, Original Message").

The LIKE operator (for example, 509) is a standard SQL operator allowing a search with parts of words to find desired sentences (for example, if "use" is searched for in a document, the search may return "use," "user," and "confused." In some implementations, operators other than LIKE can also be used.

After the three filters 508, 510, and 512 are applied to the raw data, 72 events (514) remain for analysis. Event types 516 pertaining to the 72 remaining events (514) are available for selection by an analyst. As stated above, the event types are based on normalized log data. The other event types are considered "Null" fields and are unique for the filter criteria.

At this point, an analyst can choose to select a Null file bubble to add a filter to the filter criteria (here "Event Code 72(1)" 518). As noted, this filter is based on normalized log data. As this value is unique for the current filter criteria, the filter results of 72 events and the same distribution represented by the bubbles will not change.

Figure 6:
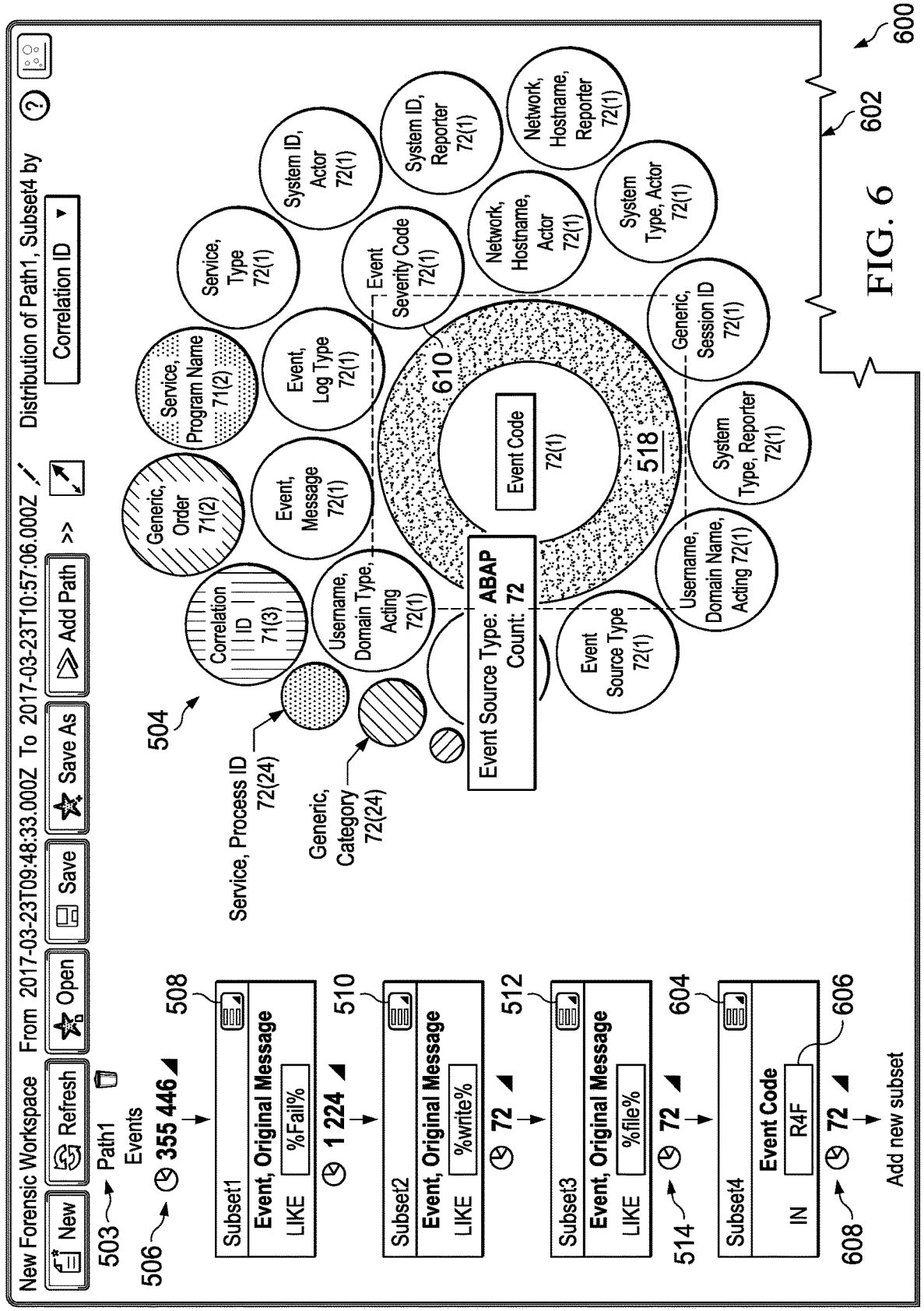
FIG. 6 is an illustration of a screenshot of an ETD forensic lab following selection of a bubble in a bubblegram to act as a filter, according to an implementation.

FIG. 6 is an illustration of a screenshot 600 of an ETD forensic lab 602 following selection of a bubble in a bubblegram to act as a filter, according to an implementation. Continuing from FIG. 5, once the bubble 518 is selected, a new filter 604 is added to the filter list and the bubblegram 504 changes (particularly bubble 518) to reflect the selection. For example, if the "Event, Code" value is "R4F", each of the 72 events is already associated with this value so the distribution does not change (although visually the bubblegram 504 may change orientation). Note that filter 604 reflects "R4F" at 606. As expected, 72 events are associated with the filter created by selection of the bubble 518. The data distribution in the bubblegram 504 also remains the same.

On selection, bubble 518 expands and is places approximately in the middle of the bubblegram 504. In some implementations, hovering over the expanded bubble 518 can display a pop-up dialog 610 that can provide additional information related to the event type associated with bubble 518 (here, "Event Source Type: ABAP; Count 72").

At this point, an analyst can choose to select another "gray" bubble (for example, "Event, Severity Code 72(1)" 610. Note that this filter will also be based on normalized log data. Upon selection, another filter will be added to the existing filter list.

Figure 7A:
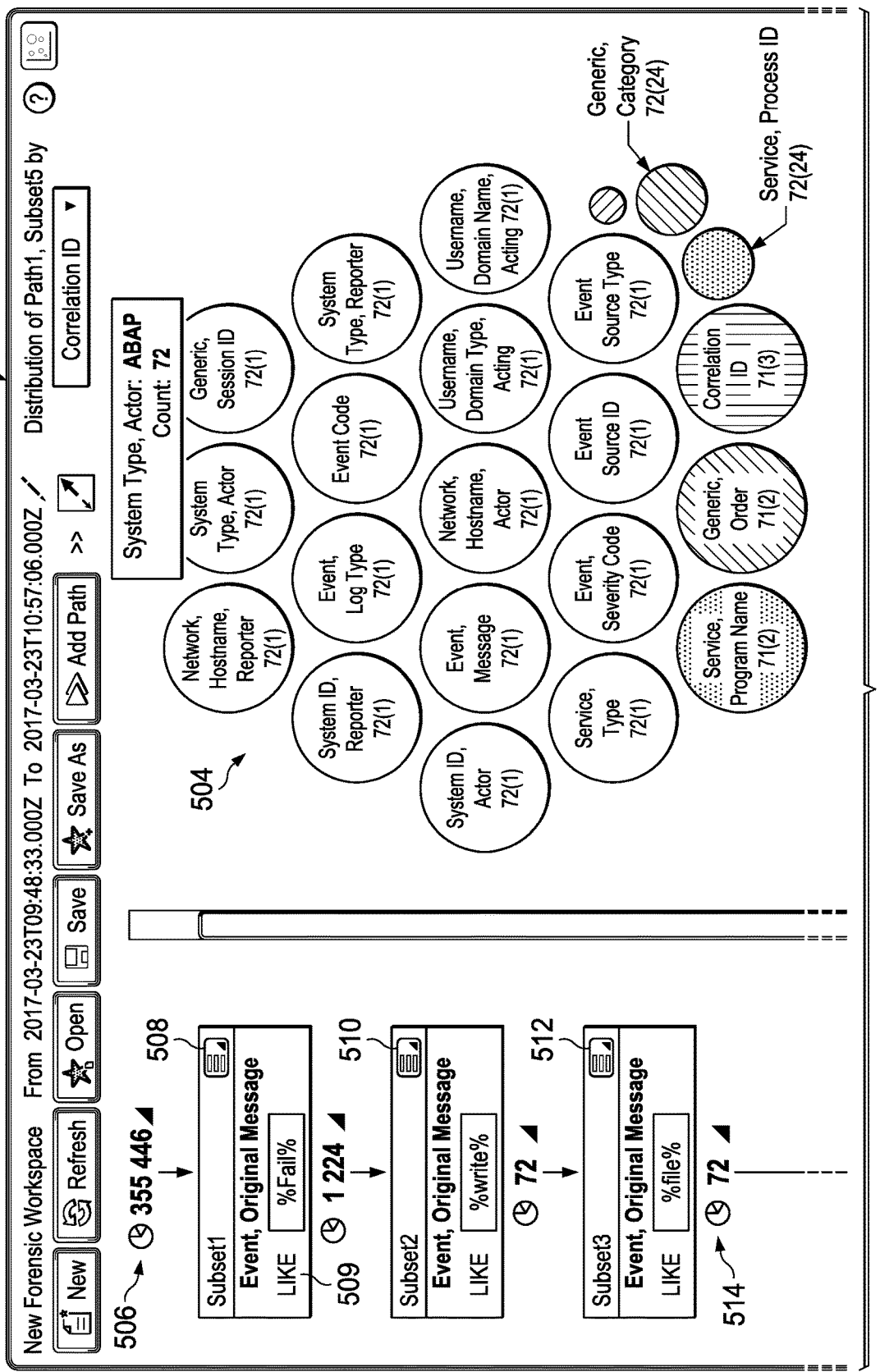
FIGS. 7A-7B illustrate a screenshot of an ETD forensic lab following selection of a second bubble in a bubblegram to act as a filter, according to an implementation.
Figure 7B:
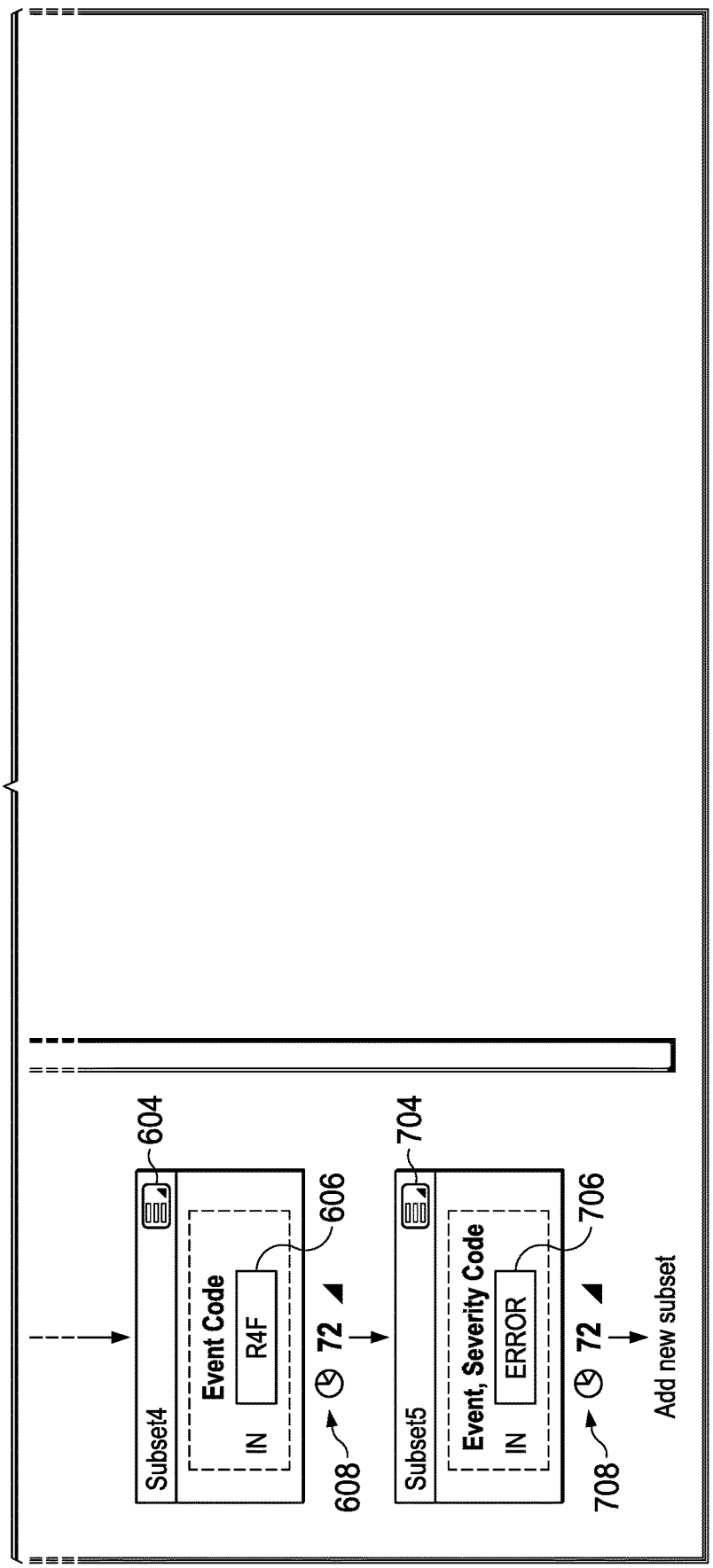

FIGS. 7A-7B illustrate a screenshot 700 of an ETD forensic lab 702 following selection of a second bubble in a bubblegram to act as a filter, according to an implementation. Continuing from FIG. 6, once bubble 610 is selected (note that the expanded bubble is not illustrated in the bubblegram in FIGS. 7A-7B), a new filter 704 is added to the filter list. For example, if the "Event, Severity Code" value is "ERROR", each of the 72 events is already associated with this value so the distribution does not change (although visually the bubblegram 504 may change orientation). Note that filter 704 reflects "ERROR" at 706. As expected, 72 events 708 are still associated with the filter created by the selection of bubble 610. The data distribution in the bubblegram 504 also remains the same.

Figure 8:
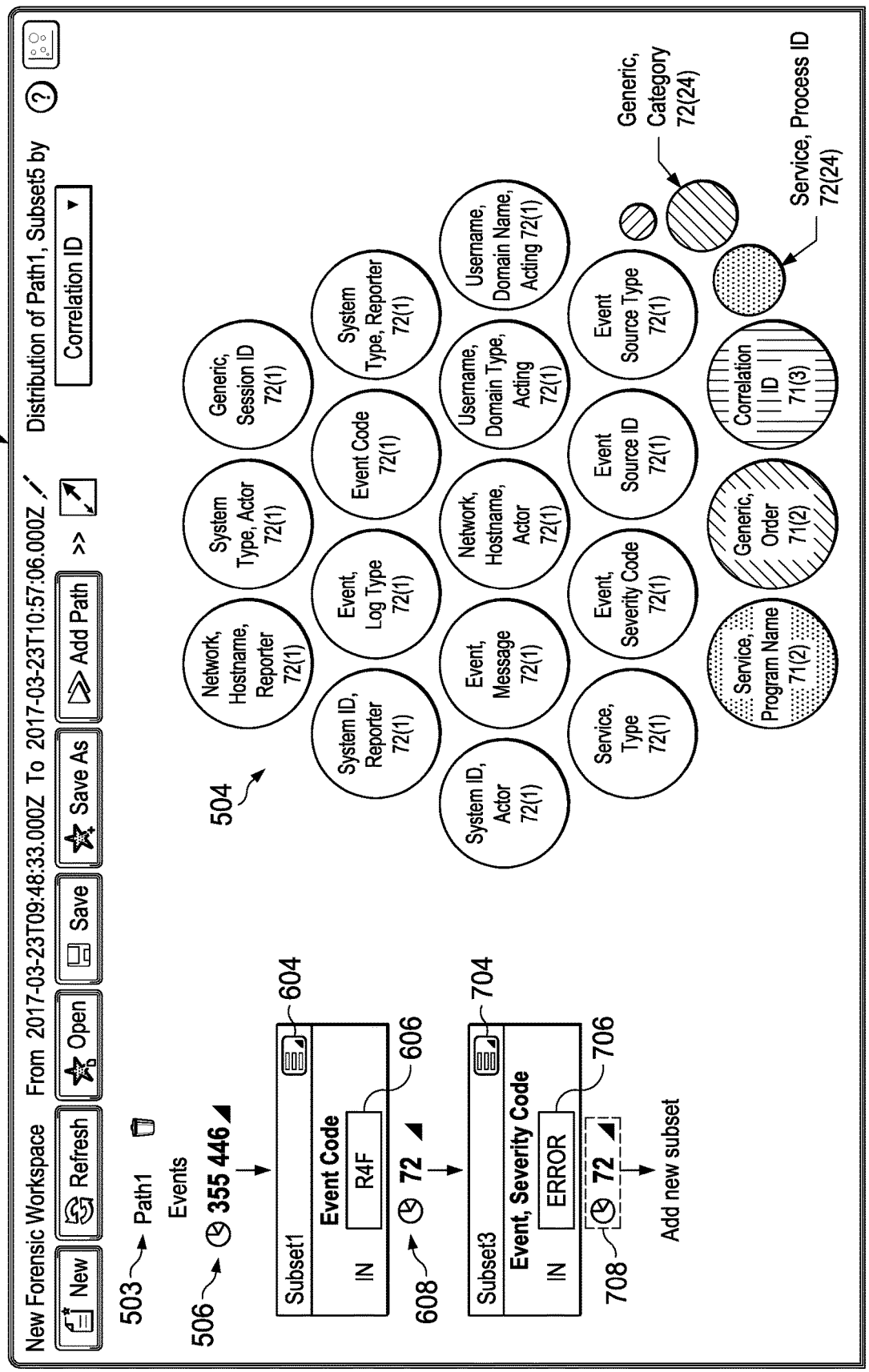
FIG. 8 is an illustration of a screenshot of an ETD forensic lab following deletion of filters associated with raw data, according to an implementation.

FIG. 8 is an illustration of a screenshot 800 of an ETD forensic lab 802 following deletion of filters associated with raw data, according to an implementation. Referring back to FIGS. 7A-7B, in the ETD forensic lab 702, there are three filters associated with raw log data (508, 510, and 512) and two filters associated with normalized log data (606 and 706). In the described example, these filters constrain the logs redundantly, because the result of the "raw" filters is 72 events and the normalized filters would accomplish the same result. As deletion of the raw data filters 508, 510, and 512 would not change the result, filters 508, 510, and 512 are redundant.

Accordingly, some of the filters can be deleted for efficiency reasons. In some implementations, various GUI mechanisms can be provided to indicate and select a specific filter for deletion. Here, an analyst chooses to delete the first three filters (508, 510, and 512). Referring to FIG. 8, it is clear that the bubblegram 504 is the same as in FIG. 5 and that 72 events are available after filtering according to the filters selected in FIGS. 6 and 7. If the final result differed from the original result (that is 72 events, the same bubblegram distribution, etc.), then some additional filters based on other "gray" fields (attributes of normalized data) can be added until filtered data meets expectations.

By deleting filters 508, 510, and 512, filter criteria based on the raw data was semantically translated into filter criteria based on the normalized data. As seen here, the sematic attributes "Event Code" and "Event, Severity Code" and values "R4F" and "ERROR" for these filters are not obvious for a user that does not have expertise in ETD. Even less obvious for a non-expert of ETD is the finding that the "Fail write file" action can be found over values "R4F" and "ERROR" of sematic attributes "Event Code" and "Event, Severity Code." The use of the bubblegram permits this understanding and definition of filters for an ETD pattern.

While it is possible to keep filters based on raw data (that is, same results occur (as previously explained)), SQL queries based on normalized data are many times faster (for example, 8 times faster) to execute than those performed over raw data. This is because in a free text search (over raw data), the entire amount of data is touched (for example, each complete log entry). AS a result, entries in each raw data log is parsed and interpreted (for example, using the LIKE operator). This processing is very time, processor, and memory intensive.

In contrast, SQL SELECTS on normalized data are usually performed with an "=" operator, where comparisons are made using already-parsed and interpreted data elements. To complete such queries, only content of particular fields-of-interest need be processed. As a result, time, processor, and memory usage is less in comparison to executing queries over raw data. As a result, free text searching is generally only reasonable using raw data and SQL queries used by ETD patterns are only reasonable using normalized data. Using ETD patterns with filters based on normalized log data can, for example, increase database processing speed, alert generation speed, and result in significantly less processing resources to execute SQL queries.

Figure 9:
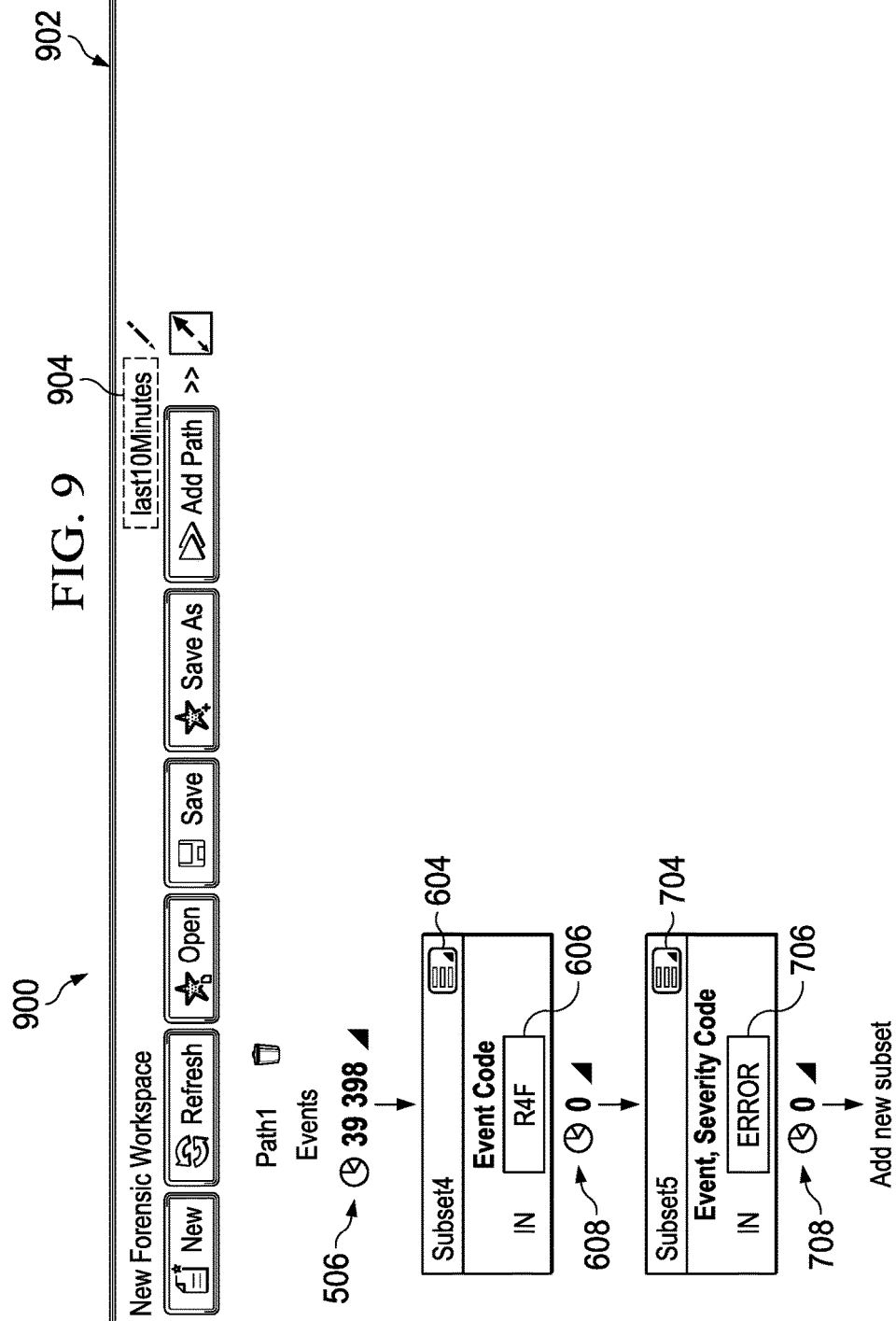
FIG. 9 is an illustration of a screenshot of an ETD forensic lab following definition of a dynamic time range, according to an implementation.

FIG. 9 is an illustration of a screenshot 900 of an ETD forensic lab 902 following definition of a dynamic time range 904, according to an implementation. The filters 606 and 706 (with Semantic Attributes "Event Code" and "Event, Severity Code", respectively) select logs that protocol "Fail write file" action. These filters are based on normalized log data and can be used for further analysis (for example, ETD pattern creation). The use of these filters increases processing efficiency in detecting events and raising alerts based on the associated ETD patterns.

As illustrated in FIG. 9, the time range 904 can also be set to a dynamic value (for example, "last10minutes" or other dynamic value—either pre- or user-defined). An ETD pattern can be completed using the dynamic time range and the normalized-data-based filters even though the search started using free text search terms "Fail write file" that is based on raw data. In other implementations, a dynamic time range can also be used with the original raw-data-based filters or a combination of raw- and normalized-data-based filters. As soon as events in logs corresponding the defined filter criteria (protocolling a "Fail write file" action) arrive at the ETD data base, a non-zero result would occur that can be used by dynamic ETD patterns (using/monitoring the dynamic time range) to raise an alert.

Figure 10A:
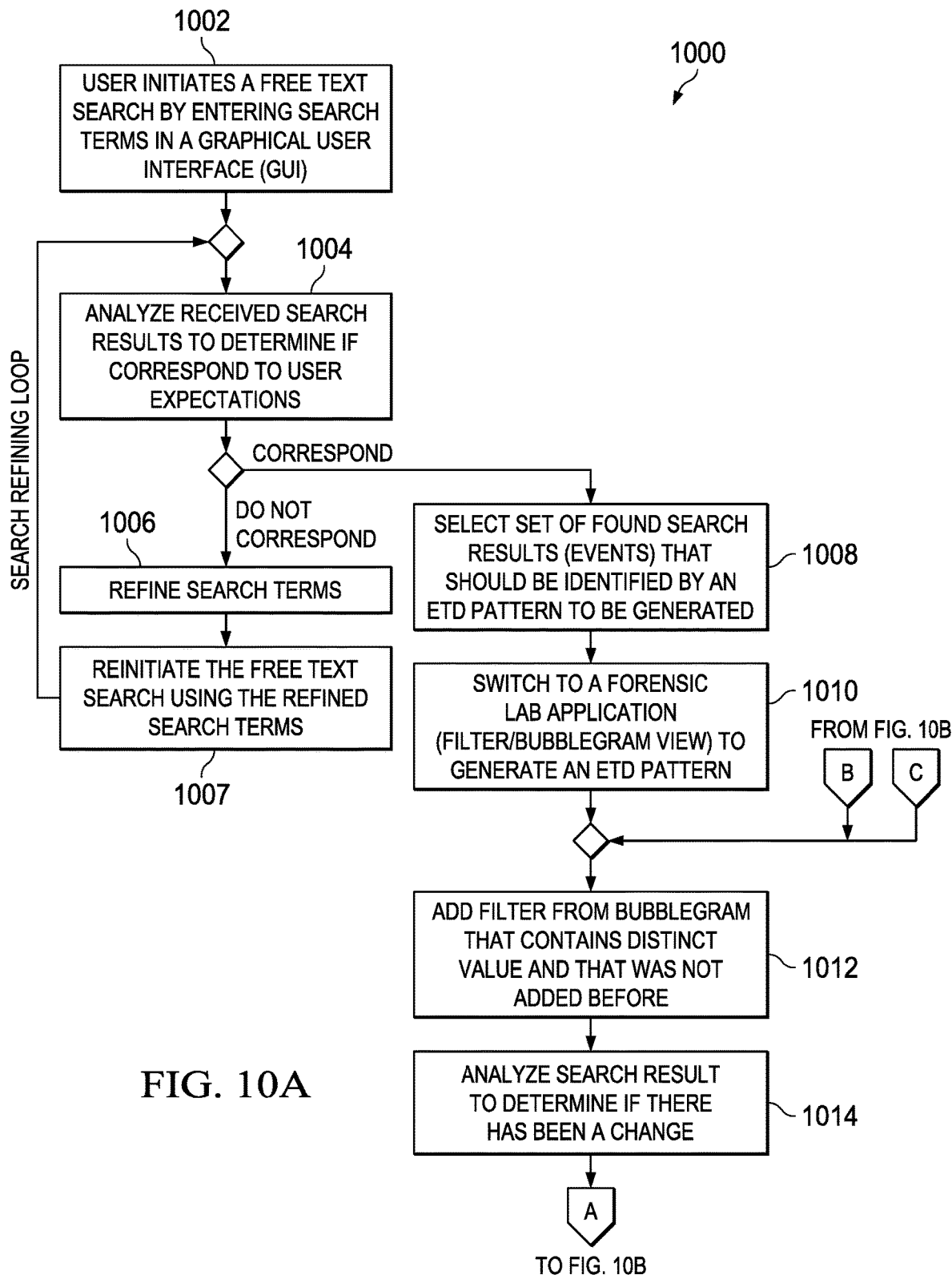
FIGS. 10A-10B illustrate a flowchart of an example method for creating patterns in ETD, according to an implementation.
Figure 10B:
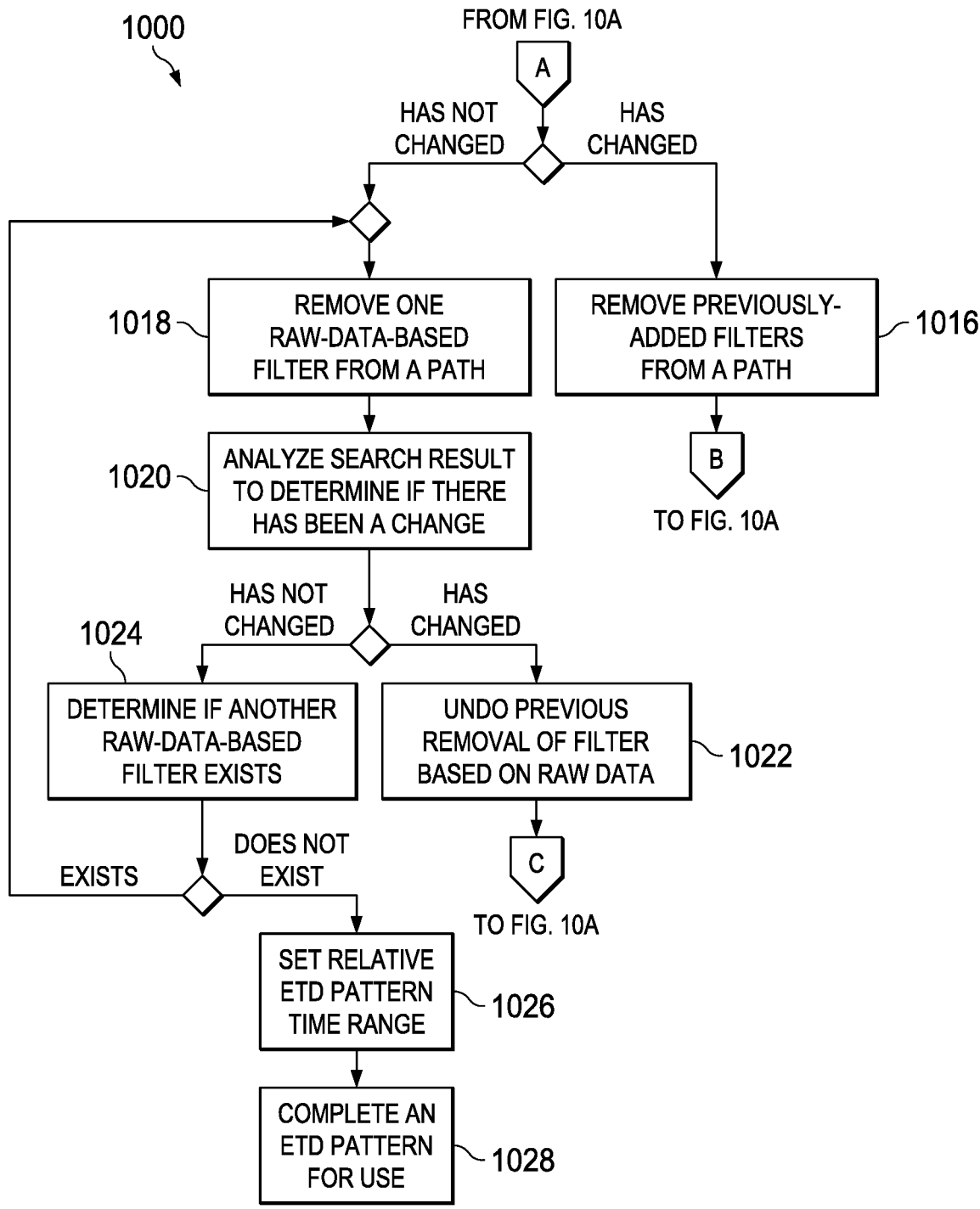

FIGS. 10A-10B illustrate a flowchart of an example method 1000 for creating patterns in ETD, according to an implementation. For clarity of presentation, the description that follows generally describes method 1000 in the context of the other figures in this description. However, it will be understood that method 1000 may be performed, for example, by any suitable system, environment, software, and hardware, or a combination of systems, environments, software, and hardware, as appropriate. In some implementations, various steps of method 1000 can be run in parallel, in combination, in loops, or in any order.

At 1002, a free text search is initiated using search terms entered into a free text search GUI to search log data for the free text. Search results are received based on the free text search. From 1002, method 1000 proceeds to 1004.

At 1004, search results are analyzed to determine if they correspond to user expectations. For example, a result is found or results are found within an expected time frame. If it is determined that the search results do not correspond to user expectations, method 1000 proceeds to 1006. If it is determined that the search results correspond to user expectations, method 1000 proceeds to 1008.

At 1006, the search terms are refined. From 1006, method 1000 proceeds to 1007.

At 1007, the free text search is reinitiated using the refined search terms. From 1007, method 1000 proceeds back to 1004.

At 1008, a set of at least one or more search results (events) is selected from the search results (for example, listed log entries) that should be identified by a completed ETD pattern. The user indicates that the selected set of search results should be processed (for example, by selecting a GUI button). From 1008, method 1000 proceeds to 1010.

At 1010, once the selected search results are indicated for processing, the GUI switches to a rendered forensic lab application with rendered event filters and a bubblegram view (for example, FIG. 5) used to complete an ETD pattern. The maximum and minimum time stamps associated with the selected search results are set as upper and lower boundaries of a time frame in the forensic lab. In some implementations, one or more filters (based on raw log data) established to filter applicable events associated with the log data corresponding to the time range may already be set in the forensic lab application (in a path). From 1010, method 1000 proceeds to 1012.

At 1012, a new event filter containing a distinct value for an event type is added from the bubblegram to a path (or to a pre-existing path) by selecting a bubblegram bubble (for example, bubble 518 in FIG. 5). The event filter is based on normalized log data and added to the path by selecting a bubble corresponding to the event type in the bubblegram view. From 1012, method 1000 proceeds to 1014.

At 1014, the user analyzes a search result to determine whether the search result has changed. The search result includes the count of events corresponding to the selected filters (for example, 608 in FIG. 6) and the distribution of data shown in the bubblegram 504. If it is determined that the search result has changed, method 1000 proceeds to 1016 on FIG. 10B. If it is determined that the search result has not changed, method 1000 proceeds to 1018 on FIG. 10B.

At 1016 on FIG. 10B, other filters previously-added to the path are removed from the path. In 1012, a filter based on normalized data was from the bubblegram. If this added filter modified the results, then this filter was not a good choice, should not be used for a final ETD pattern, and should be removed (and another filter tried at 1012). The goal is to replace all filters based on raw data with filters based on normalized data (shown in the bubblegram) without affecting the search results, so that the search results contain at least an entire set of search results as defined in 1008 and as few-as-possible other events (logs).

Note that case B can only happen, if a filter with non-distinct value was added to the path. It is unusual, but possible, that no bubbles with distinct values exist in the bubblegram. In this case, a compromise should be made and some other filter from the bubblegram should be added that changes the results as little as possible. The final goal is to complete an ETD pattern having a set of filters such that the search results cover events defined in 1008 and contain as few-as-possible other events (logs). From 1016, method 1000 proceeds back to 1012 to FIG. 10A.

At 1018, one raw-data-based filter is removed from the path. From 1018, method 1000 proceeds to 1020.

At 1020, the user analyzes the search result to determine if the search result has changed. If it is determined that the search result has changed, method 1000 proceeds to 1022. If it is determined that the search result has not changed, method 1000 proceeds to 1024. From 1020, method 1000 proceeds to 1022.

At 1022, the user performs an undo on the prior removal of the filter based on raw data (at 1018). From 1022, method 1000 proceeds back to 1012 on FIG. 10A.

At 1024, the user determines if another raw-data-based filter exists. If it is determined that another raw-data-based filter exists, method 1000 proceeds back to 1018. If it is determined that another raw-data-based filter does not exist, method 1000 proceeds to 1026.

At 1026, the user sets a relative ETD pattern time range. For example, the user can change the existing static time range to a dynamic time range (for example, "Last Hour," "Last Minute," and "last10Minutes"). By switching to the forensic lab application in 1010, the time stamps from the particular selected events were used. These timestamps build a time range covering all events selected in 1008 (that is, past events). A desired ETD pattern should include events that will happen in the future. Therefore a relative time range should be set that will cover the recent events. After adjusting the time range on the ETD pattern from an absolute time range to relative time range, the ETD pattern will find most recent data similar to that set in 1008 (due to the same search criteria). After 1026, method 1000 proceeds to 1028.

At 1028, the user completes an ETD pattern for use based on the relative ETD pattern time range. The ETD pattern defines how to present the search results selected by filters from a path (for example, the search results are grouped by users or systems). The ETD pattern also defines on what condition an alert is created (for example, if after grouping the search results by systems there are two groups (corresponding to two systems), then two alerts are created (one for each system). In addition, some metadata attributes are set for an ETD pattern to complete it (for example, a description of the ETD pattern, name, and security impact). After 1028, method 1000 stops.

Figure 11:
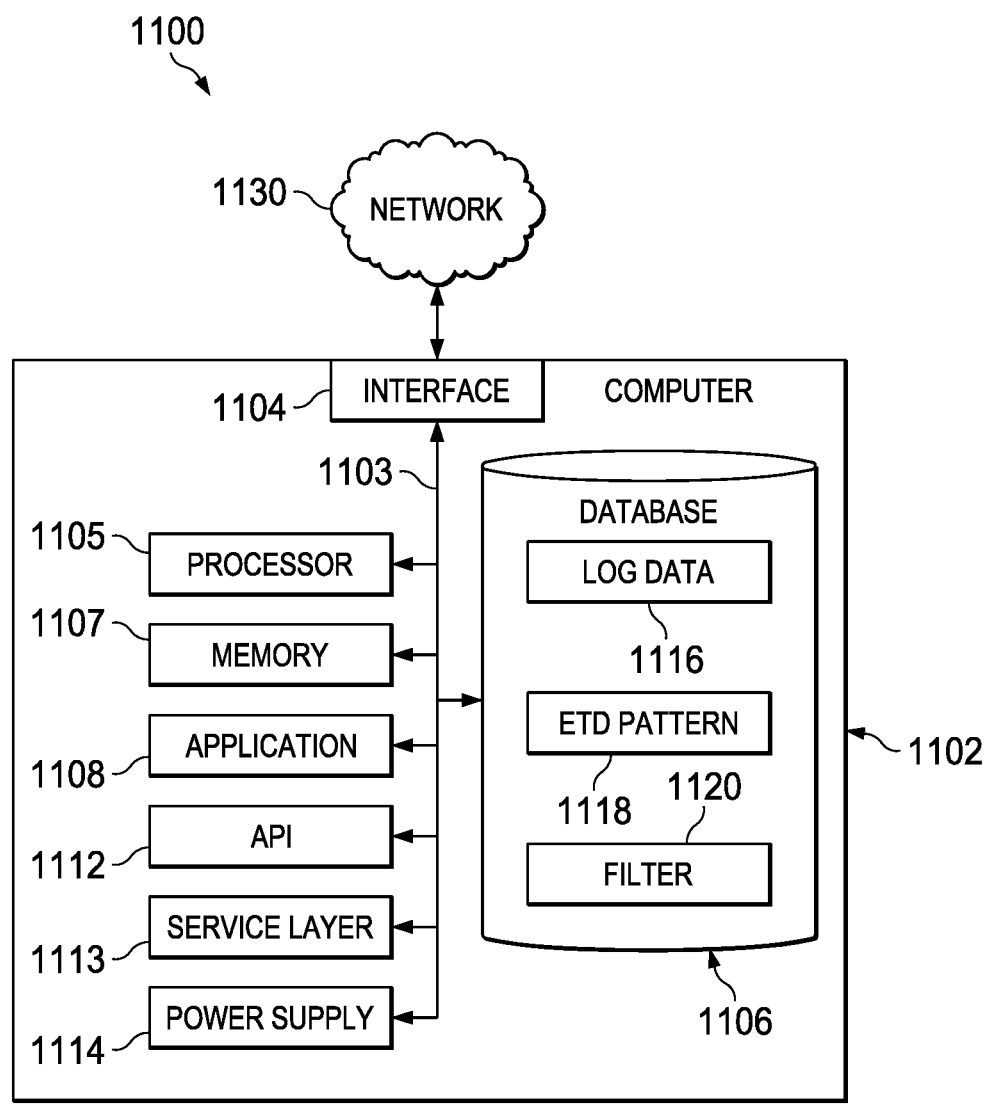
FIG. 11 is a block diagram illustrating an example computer system used to provide computational functionalities associated with described algorithms, methods, functions, processes, flows, and procedures as described in the instant disclosure, according to an implementation.

FIG. 11 is a block diagram of an example computer system 1100 used to provide computational functionalities associated with described algorithms, methods, functions, processes, flows, and procedures, as described in the instant disclosure, according to an implementation. The illustrated computer 1102 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1102 may comprise a computer that includes an input device, such as a keypad, keyboard, touch screen, or other device that can accept user information, and an output device that conveys information associated with the operation of the computer 1102, including digital data, visual, or audio information (or a combination of information), or a graphical user interface (GUI).

The computer 1102 can serve in a role as a client, network component, a server, a database or other persistency, or any other component (or a combination of roles) of a computer system for performing the subject matter described in the instant disclosure. The illustrated computer 1102 is communicably coupled with a network 1130. In some implementations, one or more components of the computer 1102 may be configured to operate within environments, including cloud-computing-based, local, global, or other environment (or a combination of environments).

At a high level, the computer 1102 is an electronic computing device operable to receive, transmit, process, store, or manage data and information associated with the described subject matter. According to some implementations, the computer 1102 may also include or be communicably coupled with an application server, e-mail server, web server, caching server, streaming data server, or other server (or a combination of servers).

The computer 1102 can receive requests over network 1130 from a client application (for example, executing on another computer 1102) and respond to the received requests by processing the received requests using an appropriate software application(s). In addition, requests may also be sent to the computer 1102 from internal users (for example, from a command console or by other appropriate access method), external or third-parties, other automated applications, as well as any other appropriate entities, individuals, systems, or computers.

Each of the components of the computer 1102 can communicate using a system bus 1103. In some implementations, any or all of the components of the computer 1102, hardware or software (or a combination of both hardware and software), may interface with each other or the interface 1104 (or a combination of both), over the system bus 1103 using an application programming interface (API) 1112 or a service layer 1113 (or a combination of the API 1112 and service layer 1113). The API 1112 may include specifications for routines, data structures, and object classes. The API 1112 may be either computer-language independent or dependent and refer to a complete interface, a single function, or even a set of APIs. The service layer 1113 provides software services to the computer 1102 or other components (whether or not illustrated) that are communicably coupled to the computer 1102. The functionality of the computer 1102 may be accessible for all service consumers using this service layer. Software services, such as those provided by the service layer 1113, provide reusable, defined functionalities through a defined interface. For example, the interface may be software written in JAVA, C++, or other suitable language providing data in extensible markup language (XML) format or other suitable format. While illustrated as an integrated component of the computer 1102, alternative implementations may illustrate the API 1112 or the service layer 1113 as stand-alone components in relation to other components of the computer 1102 or other components (whether or not illustrated) that are communicably coupled to the computer 1102. Moreover, any or all parts of the API 1112 or the service layer 1113 may be implemented as child or sub-modules of another software module, enterprise application, or hardware module without departing from the scope of this disclosure.

The computer 1102 includes an interface 1104. Although illustrated as a single interface 1104 in FIG. 11, two or more interfaces 1104 may be used according to particular needs, desires, or particular implementations of the computer 1102. The interface 1104 is used by the computer 1102 for communicating with other systems that are connected to the network 1130 (whether illustrated or not) in a distributed environment. Generally, the interface 1104 comprises logic encoded in software or hardware (or a combination of software and hardware) and is operable to communicate with the network 1130. More specifically, the interface 1104 may comprise software supporting one or more communication protocols associated with communications such that the network 1130 or interface's hardware is operable to communicate physical signals within and outside of the illustrated computer 1102.

The computer 1102 includes a processor 1105. Although illustrated as a single processor 1105 in FIG. 11, two or more processors may be used according to particular needs, desires, or particular implementations of the computer 1102. Generally, the processor 1105 executes instructions and manipulates data to perform the operations of the computer 1102 and any algorithms, methods, functions, processes, flows, and procedures as described in the instant disclosure.

The computer 1102 also includes a database 1106 that can hold data for the computer 1102 or other components (or a combination of both) that can be connected to the network 1130 (whether illustrated or not). For example, database 1106 can be an in-memory, conventional, or other type of database storing data consistent with this disclosure. In some implementations, database 1106 can be a combination of two or more different database types (for example, a hybrid in-memory and conventional database) according to particular needs, desires, or particular implementations of the computer 1102 and the described functionality. Although illustrated as a single database 1106 in FIG. 11, two or more databases (of the same or combination of types) can be used according to particular needs, desires, or particular implementations of the computer 1102 and the described functionality. While database 1106 is illustrated as an integral component of the computer 1102, in alternative implementations, database 1106 can be external to the computer 1102. As illustrated, the database 1106 holds previously described Log Data 116, ETD pattern 1118, and Filter 1120 data types.

The computer 1102 also includes a memory 1107 that can hold data for the computer 1102 or other components (or a combination of both) that can be connected to the network 1130 (whether illustrated or not). For example, memory 1107 can be random access memory (RAM), read-only memory (ROM), optical, magnetic, and the like, storing data consistent with this disclosure. In some implementations, memory 1107 can be a combination of two or more different types of memory (for example, a combination of RAM and magnetic storage) according to particular needs, desires, or particular implementations of the computer 1102 and the described functionality. Although illustrated as a single memory 1107 in FIG. 11, two or more memories 1107 (of the same or combination of types) can be used according to particular needs, desires, or particular implementations of the computer 1102 and the described functionality. While memory 1107 is illustrated as an integral component of the computer 1102, in alternative implementations, memory 1107 can be external to the computer 1102.

The application 1108 is an algorithmic software engine providing functionality according to particular needs, desires, or particular implementations of the computer 1102, particularly with respect to functionality described in this disclosure. For example, application 1108 can serve as one or more components, modules, or applications. Further, although illustrated as a single application 1108, the application 1108 may be implemented as multiple applications 1108 on the computer 1102. In addition, although illustrated as integral to the computer 1102, in alternative implementations, the application 1108 can be external to the computer 1102.

The computer 1102 can also include a power supply 1114. The power supply 1114 can include a rechargeable or non-rechargeable battery that can be configured to be either user- or non-user-replaceable. In some implementations, the power supply 1114 can include power-conversion or management circuits (including recharging, standby, or other power management functionality). In some implementations, the power-supply 1114 can include a power plug to allow the computer 1102 to be plugged into a wall socket or other power source to, for example, power the computer 1102 or recharge a rechargeable battery.

There may be any number of computers 1102 associated with, or external to, a computer system containing computer 1102, each computer 1102 communicating over network 1130. Further, the term "client," "user," and other appropriate terminology may be used interchangeably, as appropriate, without departing from the scope of this disclosure. Moreover, this disclosure contemplates that many users may use one computer 1102, or that one user may use multiple computers 1102.

Described implementations of the subject matter can include one or more features, alone or in combination.

For example, in a first implementation, a computer-implemented method, comprising: receiving search results from an initiated free text search of log data from one or more logs, the free text performed using search terms entered into a free text search graphical user interface; selecting a set of at least one search result from the search results containing an event desired to be identified in a completed enterprise threat detection (ETD) pattern; rendering a forensic lab application to complete an ETD pattern; adding an event filter for an event type based on normalized log data to a path; setting a relative ETD pattern time range; and completing an ETD pattern based on the added event filter.

The foregoing and other described implementations can each, optionally, include one or more of the following features:

A first feature, combinable with any of the following features, further comprising: analyzing the search results of the free text search to determine that the search result corresponds to a user expectation; refining the search terms; and reinitiating the free text search using the refined search terms.

A second feature, combinable with any of the previous or following features, wherein the event filter based on normalized log data is added to the path by selecting a bubble corresponding to the event type in a bubblegram view rendered in the forensic lab application.

A third feature, combinable with any of the previous or following features, further comprising analyzing a search result based on the added event filter to determine whether there has been a change in the search result value.

A fourth feature, combinable with any of the previous or following features, further comprising removing previously-added filters from the path upon determining that there has been a change in the search result value.

A fifth feature, combinable with any of the previous or following features, further comprising: removing one raw-data-based filter from the path upon determining that there has not been a change in the search result value; and analyzing the search result based on the added event filter to determine whether there has been a change in the search result value.

A sixth feature, combinable with any of the previous or following features, further comprising: determining if another raw-data-based filter exists upon determining that there has not been a change in the search result value; or undoing the removal of the one raw-data-based filter from the path upon determining that there has been a change in the search result value.

In a second implementation, a non-transitory, computer-readable medium storing one or more instructions executable by a computer system to perform operations comprising: receiving search results from an initiated free text search of log data from one or more logs, the free text performed using search terms entered into a free text search graphical user interface; selecting a set of at least one search result from the search results containing an event desired to be identified in a completed enterprise threat detection (ETD) pattern; rendering a forensic lab application to complete an ETD pattern; adding an event filter for an event type based on normalized log data to a path; setting a relative ETD pattern time range; and completing an ETD pattern based on the added event filter.

The foregoing and other described implementations can each, optionally, include one or more of the following features:

A first feature, combinable with any of the following features, further comprising one or more instructions to: analyze the search results of the free text search to determine that the search result corresponds to a user expectation; refine the search terms; and reinitiate the free text search using the refined search terms.

A second feature, combinable with any of the previous or following features, wherein the event filter based on normalized log data is added to the path by selecting a bubble corresponding to the event type in a bubblegram view rendered in the forensic lab application.

A third feature, combinable with any of the previous or following features, further comprising one or more instructions to analyze a search result based on the added event filter to determine whether there has been a change in the search result value.

A fourth feature, combinable with any of the previous or following features, further comprising one or more instructions to remove previously-added filters from the path upon determining that there has been a change in the search result value.

A fifth feature, combinable with any of the previous or following features, further comprising one or more instructions to: remove one raw-data-based filter from the path upon determining that there has not been a change in the search result value; and analyze the search result based on the added event filter to determine whether there has been a change in the search result value.

A sixth feature, combinable with any of the previous or following features, further comprising one or more instructions to: determine if another raw-data-based filter exists upon determining that there has not been a change in the search result value; or undo the removal of the one raw-data-based filter from the path upon determining that there has been a change in the search result value.

In a third implementation, a computer-implemented system, comprising: a computer memory; and a hardware processor interoperably coupled with the computer memory and configured to perform operations comprising: receiving search results from an initiated free text search of log data from one or more logs, the free text performed using search terms entered into a free text search graphical user interface; selecting a set of at least one search result from the search results containing an event desired to be identified in a completed enterprise threat detection (ETD) pattern; rendering a forensic lab application to complete an ETD pattern; adding an event filter for an event type based on normalized log data to a path; setting a relative ETD pattern time range; and completing an ETD pattern based on the added event filter.

The foregoing and other described implementations can each, optionally, include one or more of the following features:

A first feature, combinable with any of the following features, further configured to: analyze the search results of the free text search to determine that the search result corresponds to a user expectation; refine the search terms; and reinitiate the free text search using the refined search terms.

A second feature, combinable with any of the previous or following features, wherein the event filter based on normalized log data is added to the path by selecting a bubble corresponding to the event type in a bubblegram view rendered in the forensic lab application.

A third feature, combinable with any of the previous or following features, further configured to analyze a search result based on the added event filter to determine whether there has been a change in the search result value.

A fourth feature, combinable with any of the previous or following features, further configured to remove previously-added filters from the path upon determining that there has been a change in the search result value.

A fifth feature, combinable with any of the previous or following features, further configured to: remove one raw-data-based filter from the path upon determining that there has not been a change in the search result value; and analyze the search result based on the added event filter to determine whether there has been a change in the search result value.

A sixth feature, combinable with any of the previous or following features, further configured to: determine if another raw-data-based filter exists upon determining that there has not been a change in the search result value; or undo the removal of the one raw-data-based filter from the path upon determining that there has been a change in the search result value.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
  receiving search results from an initiated free text search of log data, wherein log data is extracted from one or more logs, and wherein the initiated free text search of log data is performed using search terms entered into a free text search graphical user interface;
  selecting a set of at least one search result from the search results comprising an event desired to be identified in an enterprise threat detection (ETD) pattern;
  rendering a forensic lab application to complete the ETD pattern;
  normalizing the log data to generate normalized log data;
  adding an event filter, as an added event filter, to a path for an event type based on the normalized log data; and
  completing the ETD pattern based on the event filter.

2. The computer-implemented method of claim 1, further comprising:
  analyzing the search results of the initiated free text search to determine that at least one search result of the search results corresponds to a user expectation;
  refining the search terms as refined search terms; and
  reinitiating the initiated free text search using the refined search terms.

3. The computer-implemented method of claim 1, wherein the event filter based on the normalized log data is added to the path by selecting a bubble corresponding to the event type in a bubblegram view rendered in the forensic lab application.

4. The computer-implemented method of claim 1, further comprising analyzing the search results based on the added event filter to determine whether a search result value comprises a change.

5. The computer-implemented method of claim 4, further comprising in response to determining that the search result value comprises the change, removing previously-added filters from the path.

6. The computer-implemented method of claim 4, further comprising:
   in response to determining that the search result value remained unchanged, performing a removal of one raw-data-based filter from the path; and
   analyzing the search result based on the added event filter to determine whether the search result value comprises the change.

7. The computer-implemented method of claim 6, further comprising:
   in response to determining that the search result value remained unchanged, determining if another raw-data-based filter exists upon; or
   in response to determining that the search result value comprises the change, undoing the removal of the one raw-data-based filter from the path.

8. A non-transitory, computer-readable medium storing one or more instructions executable by a computer system to perform operations comprising:
   receiving search results from an initiated free text search of log data, wherein log data is extracted from one or more logs, and wherein the initiated free text search of log data is performed using search terms entered into a free text search graphical user interface;
   selecting a set of at least one search result from the search results containing an event desired to be identified in an enterprise threat detection (ETD) pattern;
   rendering a forensic lab application to complete the ETD pattern;
   normalizing the log data to generate normalized log data;
   adding an event filter, as an added event filter, to a path for an event type based on the normalized log data; and
   completing the ETD pattern based on the event filter.

9. The non-transitory, computer-readable medium of claim 8, wherein the operations further comprise:
   analyzing the search results of the initiated free text search to determine that at least one search result of the search results corresponds to a user expectation;
   refining the search terms as refined search terms; and
   reinitiating the initiated free text search using the refined search terms.

10. The non-transitory, computer-readable medium of claim 8, wherein the event filter based on the normalized log data is added to the path by selecting a bubble corresponding to the event type in a bubblegram view rendered in the forensic lab application.

11. The non-transitory, computer-readable medium of claim 8, wherein the operations further comprise analyzing the search results based on the added event filter to determine whether a search result value comprises a change.

12. The non-transitory, computer-readable medium of claim 11, wherein the operations further comprise in response to determining that the search result value comprises the change, removing previously-added filters from the path.

13. The non-transitory, computer-readable medium of claim 11, wherein the operations further comprise:
   in response to determining that the search result value remained unchanged, performing a removal of one raw-data-based filter from the path; and
   analyze the search result based on the added event filter to determine whether the search result value comprises the change.

14. The non-transitory, computer-readable medium of claim 13, wherein the operations further comprise:
   in response to determining that the search result value remained unchanged, determining if another raw-data-based filter exists upon; or
   in response to determining that the search result value comprises the change, undoing the removal of the one raw-data-based filter from the path.

15. A computer-implemented system, comprising:
   a computer memory; and
   a hardware processor interoperably coupled with the computer memory and configured to perform operations comprising:
      receiving search results from an initiated free text search of log data, wherein log data is extracted from one or more logs, and wherein the initiated free text search of log data is performed using search terms entered into a free text search graphical user interface;
      selecting a set of at least one search result from the search results containing an event desired to be identified in an enterprise threat detection (ETD) pattern;
      rendering a forensic lab application to complete the ETD pattern;
      normalizing the log data to generate normalized log data;
      adding an event filter, as an added event filter, to a path for an event type based on the normalized log data; and
      completing the ETD pattern based on the event filter.

16. The computer-implemented system of claim 15, further configured to:
   analyze the search results of the initiated free text search to determine that at least one search result of the search results corresponds to a user expectation;
   refine the search terms as refined search terms; and
   reinitiate the initiated free text search using the refined search terms.

17. The computer-implemented system of claim 16, wherein the event filter based on the normalized log data is added to the path by selecting a bubble corresponding to the event type in a bubblegram view rendered in the forensic lab application.

18. The computer-implemented system of claim 16, wherein the operations further comprise analyzing the search results based on the added event filter to determine whether a search result value comprises a change.

19. The computer-implemented system of claim 18, wherein the operations further comprise in response to determining that the search result value comprises the change, removing previously-added filters from the path.

20. The computer-implemented system of claim 18, wherein the operations further comprise:
   in response to determining that the search result value remained unchanged, performing a removal of one raw-data-based filter from the path; and
   analyze the search result based on the added event filter to determine whether the search result value comprises the change.

* * * * *